United States Patent
Vardell

[15] 3,664,449
[45] May 23, 1972

[54] TRACK LAYING ACCESSORY FOR A TRACTOR

[72] Inventor: Joseph R. Vardell, 219 North Main Street, Kenneth, Mo. 63867

[22] Filed: May 4, 1970

[21] Appl. No.: 34,180

[52] U.S. Cl..............................180/9.48, 180/9.5, 180/9.64, 305/29
[51] Int. Cl.............................................................B62d 55/04
[58] Field of Search................180/9.5, 9.52, 9.54, 9.6, 9.64, 180/9.2 R, 9.2 CD, 9.48; 305/29; 280/80

[56] References Cited

UNITED STATES PATENTS

| | | | |
|---|---|---|---|
| 1,388,750 | 8/1921 | Palmer | 180/9.5 |
| 2,745,503 | 5/1956 | Fisher | 180/9.5 |

Primary Examiner—Kenneth H. Betts
Assistant Examiner—John A. Pekar
Attorney—Gravely, Lieder & Woodruff

[57] ABSTRACT

Tractors having extended drive axles are provided with improved traction by removing the large drive wheels normally on those axles and replacing each of them with a track laying accessory which includes a beam having a track sprocket at one end, a guide wheel at its opposite end, and a plurality of bogie wheels along its underside. An endless track is trained over the track sprocket as well as over the guide and bogie wheels. A hub is journaled on the frame and that hub receives and is secured to the extended drive axle of the tractor in the same manner as a conventional wheel hub. The hub and track sprocket are connected through a chain-and-sprocket drive which affords the tractor the same ground speed as the wheel the accessory replaces.

12 Claims, 5 Drawing Figures

PATENTED MAY 23 1972

3,664,449

INVENTOR:
Joseph R. Vardell
BY Gravely, Lieder & Woodruff
ATTORNEYS.

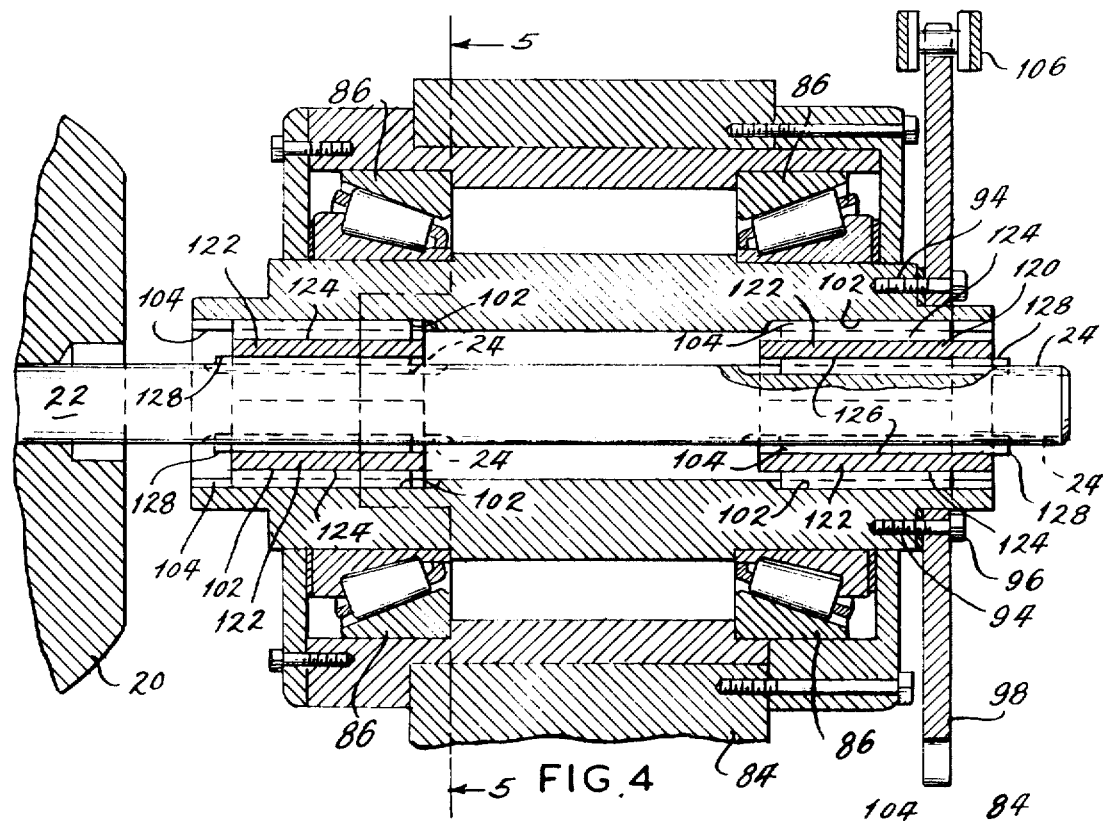
FIG. 4
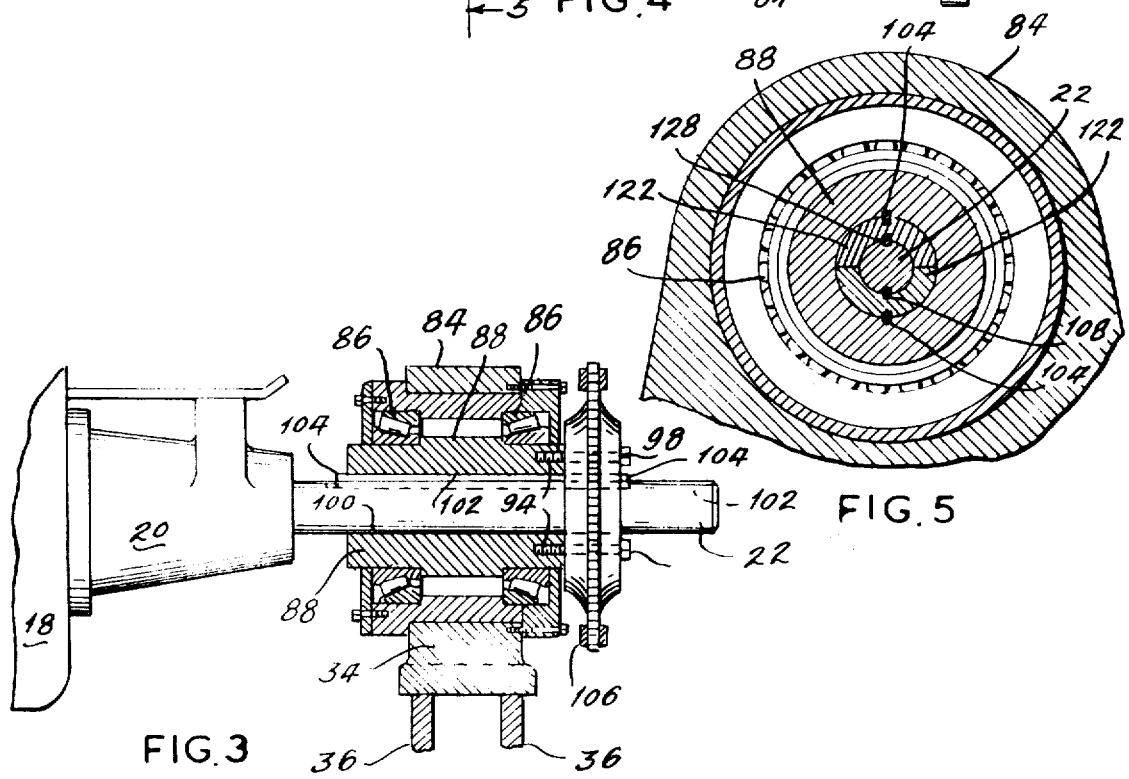
FIG. 5
FIG. 3

TRACK LAYING ACCESSORY FOR A TRACTOR

BACKGROUND OF THE INVENTION

This invention relates in general to tractors and more particularly to a track laying accessory for tractors.

The great majority of farm tractors in use today are wheeled vehicles, the rear wheels of which are considerably larger than the front wheels. Normally, only the rear wheels are powered by the tractor motor, and the power is transferred to those wheels through a transmission, differential, and a pair of axles which are journaled in and project beyond axle housings. In some tractors, known as row-crop tractors, the portions of the axles located beyond the axle housings are of extended length and the drive wheels are constructed for securement to those axles anywhere along the exposed or outwardly projecting portions of them. This enables the farmer to adjust the spacing between the tractor drive wheels to conform whatever row spacing he selects for his crops.

Notwithstanding, the large diameters of the drive wheels on tractors of current manufacture, adequate traction is still difficult to obtain under some conditions such as in the nearly saturated soil required for growing rice or in muddy fields which are quite common in the spring of the year. To improve traction tractor manufacturers have developed various devices, none of which have been very successful. Perhaps the simplest method of improving traction is to use wider or so-called rice tires, but these tires offer only a slight improvement in traction over conventional tires. In this same vein, tractors may be fitted with dual rear wheels on each side, but these wheels increase the tread width substantially and make it all the more difficult to guide the tractor between closely spaced rows of crops. One common method of improving traction is to add weights to the tractor drive wheels. These weights, however, increase the weight of the entire tractor and are therefore not suitable for use on tractors operated on soft or moist soils. Finally, some tractors have four-wheel drive, but four-wheel drive units are extremely complex and expensive.

SUMMARY OF THE INVENTION

One of the principal objects of the present invention is to provide a traction improving accessory for installation on conventional tractors. Another object is to provide an accessory of the type stated which renders conventional tractors ideally suited for use in extremely soft soils such as the soil in which rice is cultivated. A further object is to provide an accessory of the foregoing type which is easily and quickly installed on tractors of the row-crop variety. An additional object is to provide an accessory of the type stated which fits the axles of row-crop tractors of various manufactures. Still another object is to provide an accessory of the type stated which lays a track and which provides for easy alteration of the speed ratio between the power supplied to the accessory through the tractor drive axle and the speed of the track. Yet another object is to provide a track laying accessory which may be installed to provide a supporting extension to the rear of the tractor for stabilizing the tractor. These and other objects and advantages will become apparent hereinafter.

The present invention is embodied in a track laying accessory for a tractor having extended drive axles. The accessory includes a frame having a track sprocket and a guide wheel, journaled on it. An endless track is trained around the track sprocket and guide wheels, and that track is engaged and driven by the track sprocket. A suitable drive connects the track sprocket to a hub journaled on the frame, and the hub receives and is secured to the extended drive axle on the tractor. The invention also consists in the parts and in the arrangements and combinations of parts hereinafter described and claimed.

DESCRIPTION OF THE DRAWINGS

In the accompanying drawings which form part of the specification and wherein like numerals refer to like parts wherever they occur:

FIG. 3 is a sectional view taken along line 3—3 of FIG. 2;

FIG. 4 is a sectional view similar to FIG. 3 but showing bushings for adapting a single accessory for use on various makes and models of tractors; and FIG. 5 is a sectional view taken along line 5-5 of FIG. 4.

DETAILED DESCRIPTION

Figure 1:
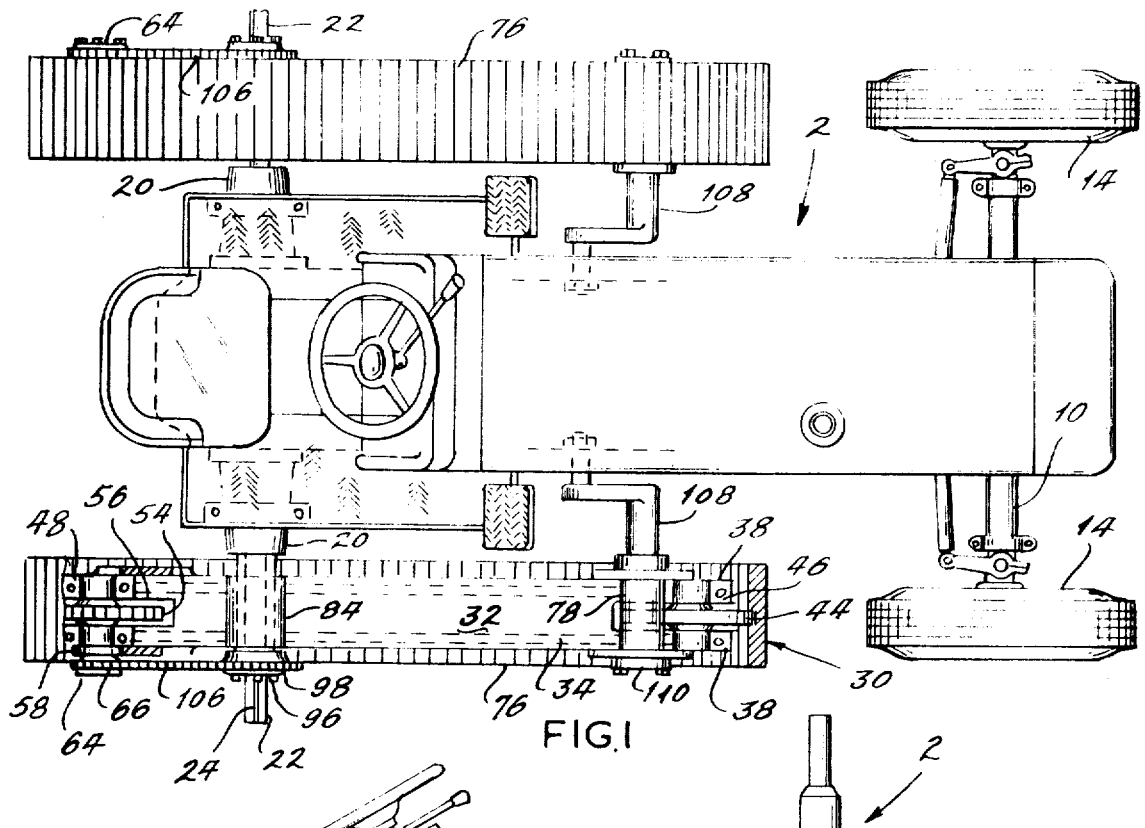
FIG. 1 is a top plan view of a tractor provided with track laying accessories constructed in accordance with and embodying the present invention.

Referring now in detail to the drawings, 2 designates a tractor having a frame 4 on which an internal combustion engine 6 is mounted. The frame 4 includes a pair of longitudinally extending channels 8, with one channel 8 extending along each side of the tractor 2. Fastened to the front end of the frame 4 is a front axle 10 having spindles 12 at its ends. Those spindles 12 have front wheels 14 journaled on them, and they furthermore pivot relative to the front axle 10 to enable the front wheels 14 to steer the tractor 2.

The power from the engine 6 is transferred through a transmission to a differential which is also mounted on the frame 4. The differential includes a differential case 18 having axle housings 20 (FIGS. 1 and 3) projecting from each side of it beyond the longitudinal channels 8 of the frame 4. Extending through and journaled in the axle housings 20 are drive axles 22, the inner ends of which are connected to the gears of the differential. The engine 6 transmits its power through the transmission to the gears of the differential which in turn rotate the axles 22. The axles 22 project considerably beyond the outer ends of the axle housings 20, and the exposed portions of them are provided with axially extending keyways 24.

Normally, large drive wheels are mounted on and keyed to the exposed ends of the axles 22, and these wheels of course not only support the rear of the tractor, but also propel it along the ground inasmuch as they are powered by the engine 6 through the axles 22.

On many tractors of current manufacture the exposed portion of each axle 22 is considerably longer than the wheel hub which fits over it so that the spacing between the rear drive wheels may be adjusted to conform to the desired crop spacing. The foregoing construction of the tractor 2 is conventional to practically all farm tractors of current manufacture which are classified as row-crop tractors.

The large rear wheels which are provided with the tractor 2, notwithstanding their size, do not provide adequate traction in soft or saturated soils. Thus, conventional tractors often become mired or at the most possess only an extremely limited pulling capability in soft earth. Consequently, such tractors are often of little value in the saturated fields where rice is cultivated, or on many Midwestern farms in the spring of the year, at which time heavy rains often soften the earth to the point that it becomes a mire. To enhance the traction of the tractor 2 and thereby increase its pulling capability, a pair of track laying accessories 30 may be installed on the axles 22 in lieu of the large diameter wheels normally fitted to those axles. Indeed, the installation of the accessories 30 is for all practical purposes the same as installing wheels on the axles 22, and accordingly the accessories 30 and large drive wheels may be used interchangeably.

Figure 2:
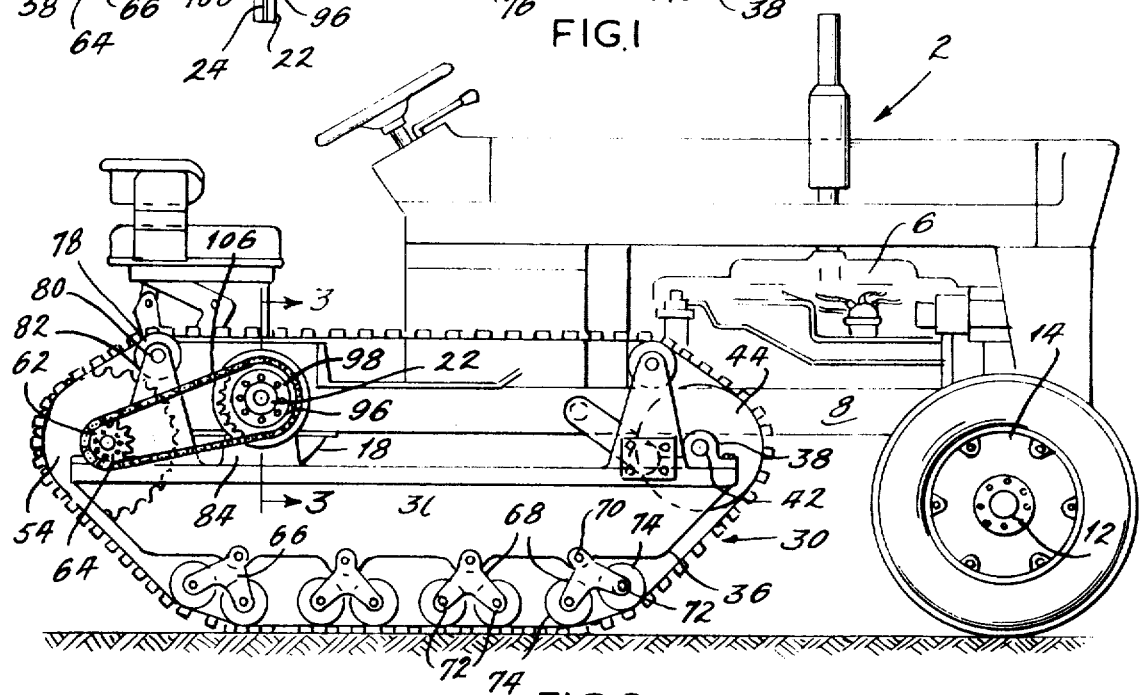
FIG. 2 is a side elevational view of the tractor and track laying accessory.

Each track laying accessory 30 includes a horizontal beam or a frame 32 composed of a single horizontal member 34 having a pair of depending members 36 welded to its underside slightly inwardly from its side edges. At its forward end the beam 32 has a pair of aligned pillow blocks 38 (FIGS. 1 and 2) bolted to the upwardly presented surface of its horizontal member 34, and these pillow blocks 38 are provided with bearings in which an axle shaft 42 is journaled. The portion of the axle shaft 42 located between the pillow blocks 38 has a guide wheel 44 fitted securely to it, and that guide wheel 44 extends downwardly through a slot 46 in the horizontal member 34. The guide wheel 44 moreover extends forwardly beyond the leading edges of the members 34 and 36 of the frame 32.

At its rear end the beam 32 has another pair of pillow blocks 48 bolted to the horizontal member 34 thereof, and those pillow blocks 48 contain bearings in which another axle shaft 52 is journaled. Keyed or otherwise securely fitted to the portion of the axle shaft 52 located between the pillow blocks 48 is a track sprocket 54 which extends downwardly through a slot 56 in the horizontal member 34. The track sprocket 54 also projects rearwardly beyond the rear ends of the horizontal member 34 and the rear ends of the vertical members 36 on the beam 32.

Beyond the outboard pillow block 48 at the rear end of the beam 32 the axle shaft 52 is provided with an enlarged shoulder 58 (FIG. 1) which is formed integral thereto and is provided with a plurality of circumferentially spaced threaded holes 60 into which stud bolts 62 (FIG. 2) are threaded. The bolts 62 pass through a chain sprocket 64 and clamp that sprocket to the shoulder 58. Thus, the track sprocket 54 and the chain sprocket 64 rotate in unison on the same axle shaft 52.

The beam 32 is supported by a plurality of closely spaced bogie assemblies 66, (FIG. 2) each of which includes a pair of bogie arms 68 the upper ends of which are fastened to cross pins 70 extending through the depending members of 36 of the beam 32. At their lower ends the arms 68 of each bogie assembly 66 are connected by a pair of spaced axles 72 and journaled on the axles 72 between the arms 68 are bogie wheels 74.

The bogie wheels 74 ride on an endless track 76 which extends upwardly at the ends of the beam 32 and is trained over the track sprocket 54 and the guide wheel 44. The track 76 makes an oblique angle with the ground and the leading and trailing ends of the depending members 34 of the frame 32 are cut off at an angle to accommodate the angular disposition of the track 76 at those ends.

The upper pass of the track 76 is supported adjacent the track sprocket 54 and also adjacent to the guide wheel 44 by idler wheels 78 (FIG. 2) which are journaled in axles 80 set into upstanding brackets 82. The lower ends of the brackets 82 are welded to the horizontal member 34 so that the brackets 82 form a part of the beam 32.

Also mounted on the horizontal member 34 of the beam 32 is a pedestal block 84 (FIG. 2) having a transversely extending bearing 86 (FIG. 3) therein which provides a journal for a rotatable hub 88 in the block 84. The pedestal block 84 forms a part of the beam 32, but is not centered thereon. On the contrary, the block 84 is positioned closer to the track sprocket 54 than it is to the guide wheel 44. The hub 88 (FIG. 3) is provided with circumferentially spaced bolt holes 94 which extend axially into it, and those holes 94 receive stud bolts 96 which clamp a drive sprocket 98 (FIG. 2) to the hub 88. Thus, the drive sprocket 98 rotates with the hub 88. The spacing between and size of the bolt holes 94 in the hub 88 and the bolt holes 60 in the axle shaft 52 are euqal so that the sprockets 64 and 98 may be interchanged.

Internally, the hub 88 has an axially extending bore 100 which is sized to snugly receive the exposed portion of the drive axle 22 extending from the axle housing 20. This bore 100 is interrupted by keyways 102 which match the keyway 24 on the drive axle 22.

The hub 88 of the track lying assembly 30 fits over the exposed portion of the drive axle 22 much in the same manner as the hub of a conventional tractor wheel fits over that axle 22. Then the keyways 24 and 102 are brought into alignment and suitable keys 104 are fitted into them from each end of the hub 88. Finally, the usual clamping devices are installed to further secure the hub 88. These clamping devices vary among tractor manufacturers and are normally incorporated into the wheel hubs. In a like manner, they are incorporated into the hub 88 of the track laying accessory 30. The clamping devices may take the form of collars clamped about the axle 22 at each end of the hub 88 to prevent the hub 88 from moving in either axial direction.

The drive sprocket 98 on the hub 88 is connected to the reduced sprocket 64 on the axle shaft 52 by a drive chain 106 which is trained over them. Hence, when the drive axle 22 of the tractor 2 rotates the hub 88, the axle shaft will also rotate, but will do so at a faster speed, inasmuch as the drive sprocket 98 is larger than the driven sprocket 52. The tractor sprocket 54, being fitted to the axle shaft 52, also rotates and draws the endless track 76 around the idler wheels 78, the guide wheel 44, the bogie wheels 74 and the track sprocket 54. In this connection, it should be noted that the drive sprocket 98, the driven sprocket 64, and the track sprocket 54 preferably are all sized to furnish a speed ratio which corresponds to the speed ratio when a convention drive wheel is on the drive axle 22.

The track 76 of course places considerably more supporting surface on the ground than does a conventional wheel, and hence the weight of the tractor 2 is distributed over a much larger area. This in turn enables the tractor 2 to manuever in extremely soft soil without becoming bogged down.

To counteract large moments which may be applied to the drive axle 22 of the tractor 2 in negotiating sharp turns, lateral stabilizing bars 108 may be installed between the beam 32 and the opposite channel 8 on the tractor frame 4. These bars should have a dog-leg configuration to compensate for limited vertical movement of the front end of the accessory 30 relative to the drive axle 22 and are secured to the front idler wheel brackets at butt plates 110.

The track laying accessory 30 is easily installed on a conventional row-crop tractor 2 merely by jacking up one of the rear axle housing 20 and removing the wheel from the elevated drive axle 22 projecting therefrom. This involves merely removing whatever clamping device is employed and then withdrawing the outermost key 104. The wheel is then pulled outwardly and its hub slides across the exposed portion of the drive axle 22. Then the track laying accessory 30 is positioned opposite to the side of the tractor 6 with the bore 100 of its hub 88 aligned with the end of the drive axle 22. Thereupon the entire track laying accessory 30 is advanced toward the tractor 2 and the axle 22 is guided into the bore 100 of the hub 88. When the accessory 30 is advanced toward the tractor 2 and the axle 22 is guided into the bore 100 of the hub 88. When the accessory 30 is spaced the proper distance from the tractor 2 the keyways 24 and 102 of the axle 22 and hub 88, respectively, are brought into alignment and the key 104 is inserted into those keyways. Thereupon the usual clamping device is tightened so that the hub 88 will not shift axially on the drive axle 22 in use.

Once the accessory 30 is fitted to the drive axle 22 the lateral stabilizer bar 108 may be installed if desired.

Another track laying accessory 30 is installed on the opposite side of the tractor 2 in the same manner.

Since the pedestal block 84 is positioned closer to the rear of the beam 32 than it is to the front of the beam 32, the major portion of the track laying accessory 30 is disposed ahead of the drive axle 22. Indeed, the track sprocket 54 does not extend any further rearwardly than the wheel the track laying accessory 30 replaces, and consequently the track laying accessory 30 does not interfere with towed implements. Nevertheless, each track laying accessory 30 may be reversed so that its track sprocket 54 is presented forwardly instead of rearwardly, and this is accomplished by merely fitting the hub 88 over the drive axle 22 from the opposite direction and installing the clamping devices in that position. When the major portion of each track laying device 30 extends rearwardly, additional support is provided to the rear of the tractor for stabilizing the tractor 2 when backhoes and similar implements are used on it.

Aside from having the capability of being reversed on the same axle 22, the accessories 30 may be alternated between axles 22 of the same tractor 2 and likewise used in a forward or reversed position on those axles 22. In other words, the accessory 30 fits both axles 22 of the tractor 2 in either the position illustrated or the reverse of that position.

With extremely powerful tractors 2 which transmit high torques through their drive axles 22, each track laying accessory 30 may be supplied with an additional drive sprocket 98, driven sprocket 64, and chain 106 trained over those sprockets. Preferably, the additional sprockets 98 and 64 are bolted to the opposite sides of the hub 88 and axle shaft 52.

Referring now to FIGS. 4 and 5, a single track laying accessory 30 may be adapted for use with numerous makes and models of tractors by enlarging the bore 100 of the hub 88 and furnishing a set of bushings 120. Each set of bushings 120 fits the enlarged bore 100 and also fits snugly over the axle 22 of one make or model of tractor. More particularly, the track laying accessory 30 when constructed for universal usage has an enlarged bore 100, the diameter of which is somewhat larger than the diameter of the largest drive axle 22 on which the accessory 30 is intended or designed to be mounted. At each end the hub 88 a keyway 102 is cut, and those keyways open into the bore 100. The drive axle 22 extends through the bore 100, but is spaced from the walls thereof by split bushings 120. Each set of bushings 120 includes two semi-circular segments 122 (FIG. 5) having outwardly opening keyways 124 which match the keyways 102 in the bore 100. The radius of the outer surface on the bushing segments 122 equals the radius of the bore 100 so that the bushings 120 fit snugly in the bore 100. The radius of the inner surface on each bushing segment 122, on the other hand, conforms to the radius of the outer surface of the drive axle 22 on the tractor 2 so that the bushings 120 fit snugly over the axle 22 and maintain it concentric with respect to the hub 88 and its bore 100. At least one of the segments 122 for each bushing 110 is provided with a keyway 126 which matches and aligns with the keyway 24 in the drive axle 22. Fitted into the aligned keyways 24 and 126 from each end of the hub 88 are keys 128 which lock the bushing segments 122 to the axle 22 for rotation therewith. Since the hub 88 is connected to the bushing segments 122 through the keys 104 it will rotate with the axle 22 so as to drive track 76.

Each set of bushings 120 has the same radius on the outwardly presented surfaces of its bushing segments 122, but on the inwardly presented surfaces the radius varies among sets. For example, when the track laying accessory 30 is to be used with a tractor 2 having a large drive axle 22 the radius of the inner surfaces on the bearing segments 112 will be large to match that axle radius, and vice versa. Again, the conventional clamping devices may take the form of collars clamped about the shaft 22 at each end of the hub 88 to prevent the hub 88 from moving either inwardly or outwardly.

Thus, by employing different sets of bushings 120, the same track laying accessory can be utilized on varying makes and models of tractors.

In lieu of the keyways 24 and 102 and the keys 104, the bushings 120 may be splined to the hub 88.

This invention is intended to cover all changes and modifications of the example of the invention herein chosen for purposes of the disclosure which do not constitute departures from the spirit and scope of the invention.

What is claimed is:

1. For use with a tractor having a set of supporting wheels which pivot to steer the tractor and a set of powered drive axles which are extended and adapted to fit into and rotate large drive wheels; a track laying accessory comprising a rigid frame, a track sprocket on the frame, a guide wheel on the frame, an endless track trained over the track sprocket and guide wheel and being engaged with the track sprocket so that when the track sprocket rotates the track is driven across and rotates the guide wheel, a hub journalled in the frame and offset from the center of the frame, the hub having a bore sized to receive the drive axle of the tractor from either of its ends whereby the major portion of the track laying accessory can project either forwardly or rearwardly from the tractor drive axle, connecting means for securing the hub to the axle so that the two are locked together and rotate in unison, and drive transfer means connecting the hub with the track sprocket for transferring torque applied to the drive axle to the track sprocket, whereby the track is powered by the drive axle and propels the tractor along the ground.

2. A structure according to claim 1 wherein the track sprocket is fitted to an axle shaft which is journaled on the frame; and wherein the transfer means includes a drive sprocket on the hub, a driven sprocket on the axle shaft; and a drive chain trained over the drive and driven sprockets.

3. A structure according to claim 2 wherein the drive and driven sprockets are detachable from the hub and axle shaft, respectively.

4. A structure according to claim 3 wherein the drive and driven sprockets are interchangeable so that the speed ratio between the axle shaft and the track sprocket can be varied.

5. A structure according to claim 4 wherein drive and driven sprockets are bolted respectively to the hub and the axle shaft.

6. A structure according to claim 1 wherein the track sprocket is at one end of the frame, the guide wheel is at the opposite end of the frame, and the hub is journaled closer to the track sprocket than to the guide wheel.

7. A structure according to claim 6 and further characterized by bogie wheels on the underside of the frame between the track sprocket and the guide wheel for backing the lower pass of the track and for supporting the frame on the track.

8. A structure according to claim 1 and further characterized by a stabilizer bar extending between the frame and the tractor ahead of the drive axle.

9. A structure according to claim 1 wherein the bore of the hub is larger in diameter than the axle; and wherein the connecting means comprises bushings fitted around the axle and inserted into the bore of the hub.

10. For use with a tractor having a set of supporting wheels which pivot to steer the tractor and a set of powered drive axles which are extended and adapted to fit into and rotate large drive wheels; a track laying accessory comprising: a rigid frame; a track sprocket on the frame; a guide wheel on the frame; an endless track trained over the track sprocket and guide wheel and being engaged with and driven by the track sprocket so that when the track sprocket rotates the track is driven across and rotates the guide wheel; a hub journaled in the frame and having a bore larger in diameter than the drive axle of the tractor; connecting means for securing the hub to the axle so that the two are locked together and rotate in unison, the connecting means including adapter bushings fitted around the axle and inserted into the bore of the hub, and keys between the adapter bushings and the hub and between the hub and axle; and drive transfer means connecting the hub with the track sprocket for transferring torque applied to the drive axle to the track sprocket, whereby the track is powered by the drive axle and propels the tractor along the ground.

11. A structure according to claim 10 wherein the adapter bushings are split axially so that each comprises a pair of generally semi-circular segments.

12. For use with a tractor having a set of supporting wheels which pivot to steer the tractor and an axle housing from which powered drive axles extend for engagement with large drive wheels, the projection of the drive axles being substantially greater than the length of the portions of the large drive wheels which they are adapted to engage so that the spacing between the drive wheels may vary; a track laying accessory comprising: a rigid frame; a track sprocket on the frame; a guide wheel on the frame; an endless track trained over the track sprocket and guide wheel and being engaged with and driven by the track sprocket so that when the track sprocket rotates the track is driven across and rotates the guide wheel; a rotatable hub journaled in the frame and having a bore sized to receive the extended drive axle of the tractor; connecting means for securing the hub to the axle so that the hub and axle rotate in unison and such that the hub may be spaced at selected distances from the axle housing with the hub engaged with and supporting only the drive axle; and drive transfer means connecting the hub with the track sprocket for transferring torque applied to the drive axle to the track sprocket, whereby the track is powered by the drive axle and propels the tractor along the ground.

* * * * *